US007465479B2

(12) United States Patent
Bremer et al.

(10) Patent No.: US 7,465,479 B2
(45) Date of Patent: *Dec. 16, 2008

(54) POLYMERISABLE MONOCYCLIC COMPOUNDS

(75) Inventors: Matthias Bremer, Darmstadt (DE); Melanie Klasen-Memmer, Heuchelheim (DE); Dagmar Klement, Gross-Zimmern (DE); Stephan Derow, Muehltal (DE)

(73) Assignee: Merck Patent Gesellschaft Mit Beschraenkter Haftung, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/326,150

(22) Filed: Dec. 23, 2002

(65) Prior Publication Data

US 2003/0160210 A1 Aug. 28, 2003

(30) Foreign Application Priority Data

Dec. 27, 2001 (EP) .................................. 01130617

(51) Int. Cl.
*C09K 19/52* (2006.01)
*C09K 19/38* (2006.01)
*C07C 25/13* (2006.01)
*C07C 25/24* (2006.01)

(52) U.S. Cl. ................... 428/1.1; 252/299.01; 570/126; 570/128

(58) Field of Classification Search ............ 252/299.01; 585/7–8; 428/1.1; 570/126, 128
See application file for complete search history.

(56) References Cited

U.S. PATENT DOCUMENTS

| 2,682,547 | A | * | 6/1954 | Clemens et al. | ............. 549/517 |
| 4,012,453 | A | * | 3/1977 | Nychka et al. | ............... 570/143 |
| 4,398,019 | A | * | 8/1983 | Cox et al. | ................... 528/183 |
| 5,506,708 | A | * | 4/1996 | Harrison et al. | ............. 349/182 |
| 5,593,617 | A | * | 1/1997 | Kelly et al. | ............. 252/299.67 |
| 6,005,137 | A | * | 12/1999 | Moore et al. | ................ 560/139 |
| 6,013,197 | A | * | 1/2000 | Parri et al. | ............ 252/299.01 |
| 6,080,821 | A | * | 6/2000 | Locatelli et al. | ............. 525/304 |
| 6,099,758 | A | * | 8/2000 | Verrall et al. | ................ 252/585 |
| 6,117,920 | A | * | 9/2000 | Jolliffe et al. | ................ 522/170 |
| 6,139,772 | A | * | 10/2000 | Ukon | ..................... 252/299.61 |
| 6,171,518 | B1 | * | 1/2001 | Hikmet et al. | ......... 252/299.01 |
| 6,217,948 | B1 | * | 4/2001 | Verrall et al. | ................ 427/492 |
| 6,316,066 | B1 | * | 11/2001 | Jolliffe et al. | ................ 428/1.1 |
| 6,466,297 | B1 | * | 10/2002 | Goulding et al. | ............ 349/175 |
| 6,544,605 | B1 | * | 4/2003 | Verrall et al. | ................. 428/1.3 |
| 6,552,102 | B2 | * | 4/2003 | Poetsch et al. | .............. 522/167 |
| 6,667,793 | B2 | * | 12/2003 | Goulding et al. | ............ 349/183 |
| 6,677,042 | B2 | * | 1/2004 | Kuntz et al. | .................. 428/402 |
| 2003/0044690 | A1 | * | 3/2003 | Rotto | ............................. 430/1 |

FOREIGN PATENT DOCUMENTS

| JP | 01-236205 | * | 9/1989 |
| JP | 2-49029 | * | 2/1990 |
| JP | 2-88622 | * | 3/1990 |
| JP | 5-303002 | * | 11/1993 |
| JP | 2000-227669 | * | 8/2000 |
| JP | 2002-363280 | * | 12/2002 |
| WO | 98/42799 | * | 10/1998 |
| WO | WO 01/06319 | * | 1/2001 |

OTHER PUBLICATIONS

English translation of Adachi et al.*
English translation by computer for JP 2000-227669, http://www4.ipdl.ncipi.go.jp/Tokujitu/PAJdetail.ipdl?N0000=60&N0120=01&N2001=2&N3001=2000-227669.*
CA 133: 170228, 2000.*
CA 88: 36693, 1977.*
CAPLUS 1987: 177221.*
English abstract for JP 2002-236280.*
CA 134:108074, 2001.*
CAPLUS 1955: 46420.*
CAPLUS 1976: 135747.*
CAPLUS 1990: 498814.*
CAPLUS 1997: 223968.*
CAPLUS 1997: 564910.*
CAPLUS 1972: 152785.*
CAPLUS 1998: 265735.*
English abstract for JP 02-049029, 1990.*
CAPLUS 1990: 498716.*
CAPLUS 1956: 12315.*

* cited by examiner

*Primary Examiner*—Shean C Wu
(74) *Attorney, Agent, or Firm*—Millen, White, Zelano & Branigan, P.C.

(57) ABSTRACT

The invention relates to polymerisable monocyclic compounds, their use in liquid crystal mixtures, polymers and polymer films, and the use of the compounds, mixtures, polymers and polymer films in optical, electrooptical and electronic devices, for decorative and security applications.

23 Claims, No Drawings

POLYMERISABLE MONOCYCLIC COMPOUNDS

FIELD OF THE INVENTION

The invention relates to polymerisable monocyclic compounds, to liquid crystal mixtures, polymers and polymer films prepared thereof, and to the use of the compounds, mixtures, polymers and polymer films in optical and electrooptical devices like liquid crystal displays or optical films, adhesives, synthetic resins with anisotropic mechanical properties, cosmetics, diagnostics, liquid crystal pigments, decorative and security applications, nonlinear optics, optical information storage, electronic devices like organic field effect transistors (FET or OFET), electroluminescent devices, or as chiral dopants.

BACKGROUND AND PRIOR ART

Polymerisable compounds have been described in prior art for various purposes. For example, they can be used in polymerisable liquid crystal mixtures, which are aligned in their liquid crystal phase and subsequently polymerized in situ to give linear or crosslinked liquid crystal polymer films with uniform orientation of high quality. These films can be used as optical elements like polarisers or compensators in flat panel displays, as described for example in EP 0 397 263, EP 0 606 940 WO 97/35219, WO 98/00475, WO 98/04651 or WO 98/12584.

Polymerisable compounds have also been suggested for use in polymerised cholesteric liquid crystal films or coatings that show selective reflection of visible light and are suitable as optical films and for preparation of liquid crystal pigments, as described for example in WO 97/30136. Another important field of use are security markings as described for example in U.S. Pat. No. 5,678,863, or hot stamping foils as described for example in GB 2,357,061.

For the above applications, usually mixtures of two or more polymerisable compounds are used, as they have lower melting points than single compounds. It is especially desired to have available polymerisable mixtures exhibiting a liquid crystal phase, preferably a nematic or chiral nematic phase, at room temperature, so that it is possible to carry out alignment and polymerisation at low temperatures. Therefore, it is advantageous if the polymerisable compounds do not suppress or in the ideal case do enhance liquid crystalline phase behaviour of the mixture.

Further to the use as optical films in displays, polymerisable compounds have been suggested for use in the active, switchable layer of a liquid crystal display.

For example, displays are known which are switched between transparent and scattering states and comprise a low molar mass liquid crystal (LC) medium and a phase-separated polymerised liquid crystal material, like for example PDLC (polymer dispersed liquid crystal) displays as described in WO 93/22397, or polymer gel or polymer network displays of the scattering type, as described in U.S. Pat. No. 5,538,768, U.S. Pat. No. 5,543,075 or EP 0 451 905.

Furthermore, displays are known wherein a low molar mass LC medium is switched between two non-scattering states, like conventional displays of e.g. the TN or STN (twisted nematic, supertwisted nematic), ECB (electrically controlled birefringence), VA (vertically aligned) or IPS (in-plane-switching) mode, and which further comprise a polymerised liquid crystal material in order to create a multidomain structure for improving the contrast at wide viewing angles or to stabilise the different switching states for reducing the driving voltage and switching times. Such displays are described for example in U.S. Pat. No. 5,189,540, U.S. Pat. No. 6,177,972, EP 0 903 392, and Hasebe et al., Jpn. J. Appl. Phys. 1994, 33, 6245.

For use in the switchable layer of LC displays the polymerisable compounds are typically mixed with a low molar mass LC medium.

Therefore it is required that the polymerisable compounds do not negatively affect the properties, like the liquid crystal phase range and birefringence, of the LC medium. For use in switchable displays that are not of the scattering type, and where the polymerised material is not macroscopically phase separated from the low molar mass LC medium, the polymerisable compounds should further show good miscibility with the LC medium.

The polymerisable mesogenic compounds described in prior art, however, do often exhibit high melting points, show poor solubility in low molar mass LC media or tend to negatively influence the liquid crystal properties of LC media.

Thus, there is a demand for polymerisable compounds with low melting points which can be used for the preparation of oriented LC polymer films, which are suitable for use in the active layer of switchable LC devices in a mixture with low molar mass LC media, and which have properties adapted to those of the LC media, and show good solubility in the LC media.

Furthermore, regarding the broad range of applications for polymerisable compounds it is desirable for the expert to have available further compounds of this type which are easy to synthesize and fulfill the various requirements as described above.

It was an aim of the invention to provide polymerisable compounds with the advantageous properties mentioned above, thus extending the pool of polymerisable compounds available to the expert. Other aims of the present invention are immediately evident to the person skilled in the art from the following detailed description.

It was found that these aims can be achieved by providing polymerisable monocyclic compounds according to the present invention.

SUMMARY OF THE INVENTION

The invention relates to polymerisable compounds of formula I

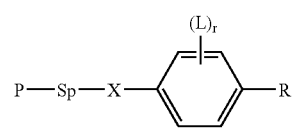

wherein
P is a polymerisable group,
Sp is a spacer group or a single bond,
X is —O—, —S—, —OCH$_2$—, —CH$_2$O—, —CO—, —COO—, —OCO—, —OCO—O—, —CO—NR$^0$—, —NR$^0$—CO—, —OCH$_2$—, —CH$_2$O—, —SCH$_2$—, —CH$_2$S—, —CH═CH—COO—, —OOC—CH═CH— or a single bond,
R is H, F, Cl, Br, I, CN, SCN, SF$_5$H, NO$_2$, or straight chain, branched or cyclic alkyl with 1 to 20 C-atoms, which may be unsubstituted, mono- or poly-substituted by F, Cl, Br, I or CN, it being also possible for one or more non-adjacent CH$_2$ groups to be replaced, in each case independently from one another, by —O—, —S—, —NH—, —NR$^o$—, —SiR$^o$R$^{oo}$—, —CO—, —COO—, —OCO—, —OCO—O—, —S—CO—, —CO—S—, —CH=CH— or —C≡C— in such a manner that O and/or S atoms are not linked directly to one another, or denotes P-Sp-X, R$^o$ and R$^{oo}$ are independently of each other H or alkyl with 1 to 4 C atoms, L is F, Cl, Br, I, CN, NO$_2$ or alkyl, alkoxy, alkylcarbonyl, alkoxycarbonyl or alkylcarbonlyoxy with 1 to 7 C atoms, wherein one or more H atoms may be substituted by F or Cl, and r is 0, 1, 2, 3 or 4.

The invention further relates to a liquid crystal mixture comprising at least one compound of formula I.

The invention further relates to a liquid crystal mixture comprising at least one compound of formula I, and further comprising at least one polymerisable mesogenic or non-mesogenic compound having at least one polymerisable group.

The invention further relates to an anisotropic polymer or polymer film prepared from one or more compounds of formula I or from a liquid crystal mixture comprising at least one compound of formula I.

The invention further relates to the use of a compound of formula I or a mixture, polymer or polymer film comprising at least one compound of formula I in liquid crystal displays, optical films, polarisers, compensators, beam splitters, reflective films, alignment layers, colour filters, holographic elements, hot stamping foils, coloured images, decorative or security markings, liquid crystal pigments, adhesives, synthetic resins with anisotropic mechanical properties, cosmetics, diagnostics, nonlinear optics, optical information storage, as chiral dopants, in electronic devices like for example field effect transistors (FET) as components of integrated circuitry, as thin film transistors in flat panel display applications or for Radio Frequency Identification (RFID) tags, or in semiconducting components for organic light emitting diode (OLED) applications such as electroluminescent displays or backlights of e.g. liquid crystal displays, for photovoltaic or sensor devices, as electrode materials in batteries, as photoconductors, or for electrophotographic applications like electrophotographic recording.

The invention further relates to a liquid crystal display comprising in its active layer at least one compound of formula I or a mixture, polymer or polymer film comprising at least one compound of formula I.

The invention further relates to a liquid crystal display selected from TN or STN displays, active matrix displays, displays of the IPS (in plane switching), VA (vertically aligned), VAN (vertically aligned nematic), VAC (vertically aligned cholesteric), ECB (electrically controlled birefringence), DAP (deformation of aligned phases), CSH (colour super homeotropic) or ASM (axially symmetric microcell) mode, phase-change, guest-host, flexoelectric or ferroelectric displays, bistable nematic or cholesteric display, PSCT (polymer stabilized cholesteric texture), PDLC, polymer gel or polymer network displays, in particular a liquid crystal display of the TN, STN, AMD-TN, ECB, VA, IPS, PSCT or PDLC mode.

Definitions of Terms

The term 'film' as used in this application includes self-supporting, i.e. free-standing, films that show more or less pronounced mechanical stability and flexibility, as well as coatings or layers on a supporting substrate or between two substrates.

The term 'mesogenic compounds' as used in the foregoing and the following should denote compounds with a rod-shaped, lath-shaped or disk-shaped mesogenic group, i.e. a group with the ability to induce mesophase behaviour. These compounds do not necessarily have to exhibit mesophase behaviour by themselves. It is also possible that these compounds show mesophase behaviour only in mixtures with other compounds or when the mesogenic compounds or the mixtures comprising them are polymerized. Rod-shaped and lath-shaped mesogenic groups are especially preferred.

For the sake of simplicity, the term 'liquid crystal material' is used hereinafter for both liquid crystal materials and mesogenic materials, and the term 'mesogen' is used for the mesogenic groups of the material.

DETAILED DESCRIPTION OF THE INVENTION

Particularly preferred are compounds of formula I, wherein

R is P-Sp-X,

R is F, Cl, CN or alkyl, alkoxy or alkenyl with 1 to 12 C-atoms which is optionally mono- or poly-substituted by F, r is 1, 2, 3 or 4, very preferably 1, 2 or 3, r is 1, 2 or 3 and L is F, Sp and X denote a single bond, Sp is alkylene with 1 to 12 C atoms which is optionally mono- or polysubstituted by F and wherein one or more non-adjacent CH$_2$ may be replaced, in each case independently from one another, by —O—, —CH=CH— or —C≡C—, X is —O—, —COO—, —OCO—, —OCOO— or a single bond.

L in formula I is preferably F, Cl, CN, OH, NO$_2$, CH$_3$, C$_2$H$_5$, OCH$_3$, OC$_2$H$_5$, COCH$_3$, COC$_2$H$_5$, COOCH$_3$, COOC$_2$H$_5$, CF$_3$, OCF$_3$, OCHF$_2$ or OC$_2$F$_5$, in particular F, Cl, CN, CH$_3$, C$_2$H$_5$, OCH$_3$, COCH$_3$ or OCF$_3$, most preferably F, C$_1$, CH$_3$, OCH$_3$ or COCH$_3$.

If R in formula I is an alkyl or alkoxy radical, i.e. where the terminal CH$_2$ group is replaced by —O—, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy, or octoxy, furthermore methyl, nonyl, decyl, undecyl, dodecyl, tridecyl, tetradecyl, pentadecyl, nonoxy, decoxy, undecoxy, dodecoxy, tridecoxy or tetradecoxy, for example.

Oxaalkyl, i.e. where one CH$_2$ group is replaced by —O—, is preferably straight-chain 2-oxapropyl (=methoxymethyl), 2-(=ethoxymethyl) or 3-oxabutyl (=2-methoxyethyl), 2-, 3-, or 4-oxapentyl, 2-, 3-, 4-, or 5-oxahexyl, 2-, 3-, 4-, 5-, or 6-oxaheptyl, 2-, 3-, 4-, 5-, 6- or 7-oxaoctyl, 2-, 3-, 4-, 5-, 6-, 7- or 8-oxanonyl or 2-, 3-, 4-, 5-, 6-,7-, 8- or 9-oxadecyl, for example.

In the compounds of formula I R may be an achiral or a chiral group. In case of a chiral group it is preferably selected according to the following formula III:

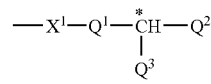

III wherein $X^1$ is —O—, —S—, —CO—, —COO—, —OCO—, —OCOO— or a single bond, $Q^1$ is an alkylene or alkylene-oxy group with 1 to 10 C atoms or a single bond, $Q^2$ is an alkyl or alkoxy group with 1 to 10 C atoms which may be unsubstituted, mono- or polysubstituted by halogen or CN, it being also possible for one or more non-adjacent $CH_2$ groups to be replaced, in each case independently from one another, by —C≡C—, —O—, —S—, —NH—, —N(CH$_3$)—, —CO—, —COO—, —OCO—, —OCO—O—, —S—CO— or —CO—S— in such a manner that oxygen atoms are not linked directly to one another, $Q^3$ is halogen, a cyano group or an alkyl or alkoxy group with 1 to 4 C atoms different from $Q^2$.

In case $Q^1$ in formula III is an alkylene-oxy group, the O atom is preferably adjacent to the chiral C atom.

Preferred chiral groups R are 2-butyl (=1-methylpropyl), 2-methylbutyl, 2-methylpentyl, 3-methylpentyl, 2-ethylhexyl, 2-propylpentyl, 2-octyl, in particular 2-methylbutyl, 2-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctoxy, 6-methyloctanoyloxy, 5-methylheptyloxycarbonyl, 2-methylbutyryloxy, 3-methylvaleroyloxy, 4-methylhexanoyloxy, 2-chlorpropionyloxy, 2-chloro-3-methylbutyryloxy, 2-chloro-4-methylvaleryloxy, 2-chloro-3-methylvaleryloxy, 2-methyl-3-oxapentyl, 2-methyl-3-oxahexyl, 1-methoxypropyl-2-oxy, 1-ethoxypropyl-2-oxy, 1-propoxypropyl-2-oxy, 1-butoxypropyl-2-oxy, 2-fluorooctyloxy, 2-fluorodecyloxy for example.

In addition, compounds of formula I containing an achiral branched group R may occasionally be of importance, for example, due to a reduction in the tendency towards crystallization. Branched groups of this type generally do not contain more than one chain branch. Preferred achiral branched groups are isopropyl, isobutyl (=methylpropyl), isopentyl (=3-methylbutyl), isopropoxy, 2-methylpropoxy and 3-methylbutoxy.

Halogen is preferably F or Cl.

The polymerisable group P is preferably selected from $CH_2$=$CW^1$—COO—,

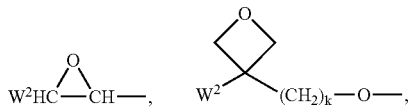

$CH_2$=$CW^2$—(O)$_{k1}$—, $CH_3$—CH=CH—O—, HO—$CW^2W^3$—, HS—$CW^2W^3$—, $HW^2$N—, HO—$CW^2W^3$—NH—, $CH_2$=$CW^1$—CO—NH—, $CH_2$=CH—(COO)$_{k1}$-Phe-(O)$_{k2}$—, Phe-CH=CH—, HOOC—, OCN— and $W^4W^5W^6$Si—, with $W^1$ being H, Cl, CN, phenyl or alkyl with 1 to 5 C-atoms, in particular H, Cl or $CH_3$, $W^2$ and $W^3$ being independently of each other H or alkyl with 1 to 5 C-atoms, in particular methyl, ethyl or n-propyl, $W^4$, $W^5$ and $W^6$ being independently of each other Cl, oxaalkyl or oxacarbonylalkyl with 1 to 5 C-atoms, Phe being 1,4-phenylene and k and $k_1$ being independently of each other 0 or 1.

Especially preferably P is an acrylate group, a methacrylate group, a vinyl or vinyloxy group, a propenyl ether group or an epoxy group, especially preferably an acrylate or a methacrylate group.

As for the spacer group Sp all groups can be used that are known for this purpose to those skilled in the art. The spacer group Sp is preferably a linear or branched alkylene group having 1 to 20 C atoms, in particular 1 to 12 C atoms, in which, in addition, one or more non-adjacent $CH_2$ groups may be replaced by —O—, —S—, —NH—, —N(CH$_3$)—, —CO—, —O—CO—, —S—CO—, —O—COO—, —CO—S—, —CO—O—, —CH(halogen)-, —C(halogen)$_2$, —CH(CN)—, —CH=CH— or —C≡C—, or a siloxane group.

Typical spacer groups are for example —(CH$_2$)$_p$—, —(CH$_2$CH$_2$O)$_r$—CH$_2$CH$_2$—, —CH$_2$CH$_2$—S—CH$_2$CH$_2$— or —CH$_2$CH$_2$—NH—CH$_2$CH$_2$— or —(SiR$^0$R$^{00}$—O)$_p$—, with p being an integer from 2 to 12, r being an integer from 1 to 3 and $R^0$ and $R^{00}$ having the meanings given in formula I.

Preferred spacer groups are ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyliminoethylene, 1-methylalkylene, ethenylene, propenylene and butenylene for example.

Further preferred are compounds with one or two groups P-Sp-X wherein Sp and/or X is a single bond.

In case of compounds with two groups P-Sp-X, each of the two polymerisable groups P, the two spacer groups Sp, and the two linkage groups X can be identical or different.

In another preferred embodiment of the invention the chiral compounds of formula I comprise at least one spacer group Sp that is a chiral group of formula IV:

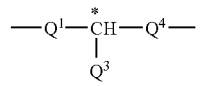

IV wherein $Q^1$ and $Q^3$ have the meanings given in formula III, and $Q^4$ is an alkylene or alkylene-oxy group with 1 to 10 C atoms or a single bond, being different from $Q^1$.

The compounds of formula I are preferably selected of the following formula

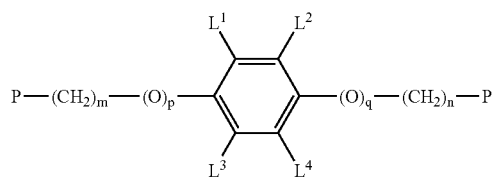

I1 wherein P is as defined in formula I, $L^{1-4}$ independently of each other denote H or have one of the meanings of L in formula I, with at least one of $L^{1-4}$ being different from H, m and n are identical or different integers from 0 to 12, and p and q are independently of each other 0 or 1, with the proviso that p is 0 when m is 0 and q is 0 when n is 0.

Especially preferred are compounds selected from the following formulae

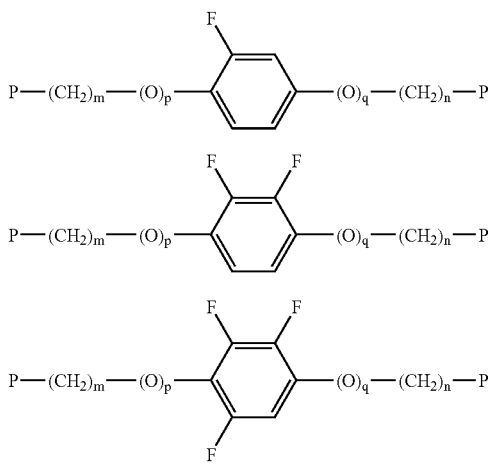

wherein P is as defined in formula I, m and n are identical or different integers from 0 to 12, and p and q are independently of each other 0 or 1, with the proviso that p is 0 when m is 0 and q is 0 when n is 0.

Especially preferred are compounds of formula I1 and I1a-I1c wherein m, n, p and q are 0.

Further preferred are compounds of formula I1 and I1a-I1c wherein P is an acrylate, methacrylate, vinyl, vinyloxy or epoxy group.

Further preferred are compounds of formula I1 and I1a-I1c wherein m and n are identical or different integers from 1 to 12, in particular from 1 to 8, and p and q are 1.

The compounds of formula I can be synthesized according to or in analogy to methods which are known per se and which are described in standard works of organic chemistry such as, for example, Houben-Weyl, Methoden der organischen Chemie, Thieme-Verlag, Stuttgart. Some specific methods of preparation can be taken from the examples.

The compounds of formula I can also be synthesized in analogy to the methods as described in U.S. Pat. No. 5,645,760 and U.S. Pat. No. 5,702,642 for mono- and direactive fluorinated biphenyl compounds.

Furthermore, the compounds of formula I can be synthesized according to or in analogy to the following reaction schemes:

Scheme 1:

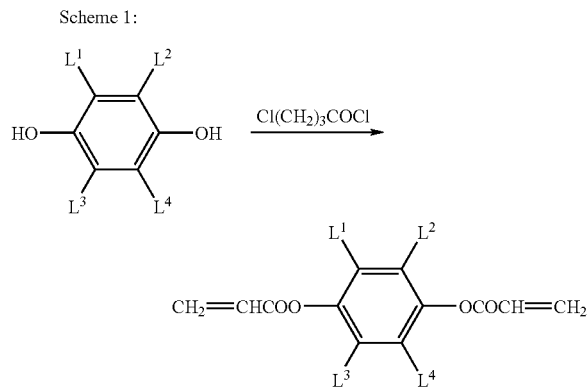

Scheme 2:

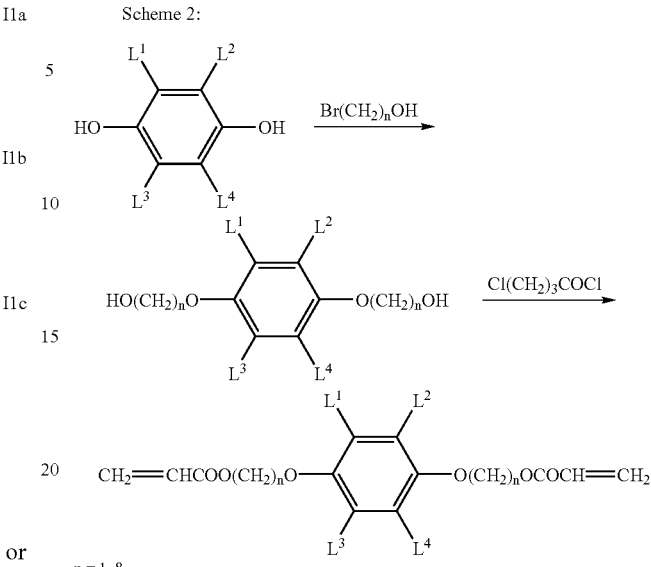

n = 1–8

The compounds of formula I can be used in a liquid crystal mixture for displays like, for example, TN or STN displays, active matrix displays, displays of the IPS, VA, VAN, VAC, ECB, DAP, CSH or ASM mode, phase-change, guest-host, flexoelectric or ferroelectric displays, bistable nematic and cholesteric displays like PSCT (polymer stabilized cholesteric texture), or PDLC, polymer gel or polymer network displays.

In particular, the polymerisable compounds of formula I and mixtures comprising them are useful for liquid crystal displays that comprise a polymer or polymer network component for the purpose of assisting alignment, mesophase stability and/or electrooptical property improvement, in particular to achieve faster response times and/or lower threshold voltages, or for the purpose to create a multidomain structure to achieve improved contrast at wide viewing angles. Such displays are for example of the TN, STN, ECB, VA, IPS, multidomain or hybrid mode, and are described for example in U.S. Pat. No. 5,189,540, U.S. Pat. No. 6,177,972, EP 0 903 392, and Hasebe et al., Jpn. J. Appl. Phys. 1994, 33, 6245.

Furthermore, the compounds of formula I are suitable as polymerisable component in active broadband polymer stabilized liquid crystal displays as described for example in H. Guillard and P. Sixou, Liq. Cryst. (2001) 28(6), 933, the entire disclosure of which is incorporated into this application by reference. These dispays comprise an active cholesteric layer with a broadened reflection wavelength band that is switchable between a planar reflective, a scattering and a homeotropic transparent state.

The compounds of formula I are also suitable as a polymer component in polymer stabilised displays, such as bistable PSCT (polymer stabilized cholesteric texture) displays, or PDLC or polymer gel displays of the scattering type. Anisotropic polymer gels and displays comprising them are disclosed for example in DE 195 04 224, GB 2 279 659, WO 93/22397, U.S. Pat. No. 5,538,768, U.S. Pat. No. 5,543,075 and EP 0 451 905

Thus, another aspect of the invention relattes to a liquid crystal mixture, in particular a nematic liquid crystal mixture, comprising at least one compound of formula I.

Another aspect of the invention relates to a liquid crystal display comprising a liquid crystal medium containing at least one compound of formula I.

For the applications described above the liquid crystal mixture preferably contains at least one compound of formula I, and a nematic host mixture comprising one or more nematic or nematogenic compounds.

Preferably the liquid crystal mixture consists of 2 to 25, preferably 3 to 15 compounds, at least one of which is a compound of formula I. The other compounds, forming the nematic host mixture, are preferably low molecular weight liquid crystal compounds selected from nematic or nematogenic substances, for example from the known classes of the azoxybenzenes, benzylidene-anilines, biphenyls, terphenyls, phenyl or cyclohexyl benzoates, phenyl or cyclohexyl esters of cyclohehexanecarboxylic acid, phenyl or cyclohexyl esters of cyclohexylbenzoic acid, phenyl or cyclohexyl esters of cyclohexylcyclohexanecarboxylic acid, cyclohexylphenyl esters of benzoic acid, of cyclohexanecarboxylic acid and of cyclohexylcyclohexanecarboxylic acid, phenylcyclohexanes, cyclohexylbiphenyls, phenylcyclohexylcyclohexanes, cyclohexylcyclohexanes, cyclohexylcyclohexenes, cyclohexylcyclohexylcyclohexenes, 1,4-bis-cyclohexylbenzenes, 4,4'-bis-cyclohexylbiphenyls, phenyl- or cyclohexylpyrimidines, phenyl- or cyclohexylpyridines, phenyl- or cyclohexylpyridazines, phenyl- or cyclohexyldioxanes, phenyl- or cyclohexyl-1,3-dithianes, 1,2-diphenyl-ethanes, 1,2-dicyclohexylethanes, 1-phenyl-2-cyclohexylethanes, 1-cyclohexyl-2-(4-phenylcyclohexyl)-ethanes, 1-cyclohexyl-2-biphenylethanes, 1-phenyl2-cyclohexylphenylethanes, optionally halogenated stilbenes, benzyl phenyl ether, tolanes, substituted cinnamic acids and further classes of nematic or nematogenic substances. The 1,4-phenylene groups in these compounds may also be laterally mono- or difluorinated.

The liquid crystal mixture of this preferred embodiment is based on the achiral compounds of this type.

The most important compounds that are possible as components of these liquid crystal mixtures can be characterized by the following formula

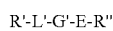

R'-L'-G'-E-R"

wherein L' and E, which may be identical or different, are in each case, independently from one another, a bivalent radical from the group formed by -Phe-, -Cyc-, -Phe-Phe-, -Phe-Cyc-, -Cyc-Cyc-, -Pyr-, -Dio-, -B-Phe- and -B-Cyc- and their mirror images, where Phe is unsubstituted or fluorine-substituted 1,4-phenylene, Cyc is trans-1,4-cyclohexylene or 1,4-cyclohexenylene, Pyr is pyrimidine-2,5-diyl or pyridine-2,5-diyl, Dio is 1,3-dioxane-2,5-diyl abd B is 2-(trans-1,4-cyclohexyl)ethyl, pyrimidine-2,5-diyl, pyridine-2,5-diyl or 1,3-dioxane-2,5-diyl.

G' in these compounds is selected from the following bivalent groups —CH═CH—, —N(O)N—, —CH═CY—, —CH═N(O)—, —C≡C—, —CH$_2$—CH$_2$—, —CO—O—, —CH$_2$—O—, —CO—S—, —CH$_2$—S—, —CH═N—, —COO-Phe-COO— or a single bond, with Y being halogen, preferably chlorine, or —CN.

R' and R" are, in each case, independently of one another, alkyl, alkenyl, alkoxy, alkenyloxy, alkanoyloxy, alkoxycarbonyl or alkoxycarbonyloxy with 1 to 18, preferably 3 to 12 C atoms, or alternatively one of R' and R" is F, CF$_3$, OCF$_3$, Cl, NCS or CN.

In most of these compounds R' and R" are, in each case, independently of each another, alkyl, alkenyl or alkoxy with different chain length, wherein the sum of C atoms in nematic media generally is between 2 and 9, preferably between 2 and 7.

Many of these compounds or mixtures thereof are commercially available. All of these compounds are either known or can be prepared by methods which are known per se, as described in the literature (for example in the standard works such as Houben-Weyl, Methoden der Organischen Chemie [Methods of Organic Chemistry], Georg-Thieme-Verlag, Stuttgart), to be precise under reaction conditions which are known and suitable for said reactions. Use may also be made here of variants which are known per se, but are not mentioned here.

The compounds of formula I and polymerisable liquid crystal mixtures comprising them are further useful for the preparation of anisotropic polymer films or coatings.

For the preparation of anisotropic polymer gels or polymer films, the liquid crystal mixture should comprise at least one polymerisable compound, which can be a compound of formula I or an additional polymerisable mesogenic or liquid crystalline compound.

Examples of suitable polymerisable mesogenic compounds that can be used as comonomers together with the compounds of formula I in a polymerisable liquid crystal mixture, are disclosed for example in WO 93/22397; EP 0,261,712; DE 195,04,224; WO 95/22586 and WO 97/00600. The compounds disclosed in these documents, however, are to be regarded merely as examples that shall not limit the scope of this invention.

Preferably the polymerizable liquid crystal mixture comprises at least one polymerisable mesogenic compound having one polymerisable functional group and at least one polymerisable mesogenic compound having two or more polymerisable functional groups.

Examples of especially useful chiral and achiral polymerisable mesogenic compounds are shown in the following lists which should, however, be taken only as illustrative and is in no way intended to restrict, but instead to explain the present invention:

(Va)

(Vb)

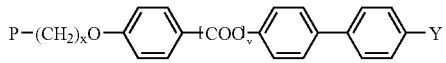

(Vc)

(Vd)

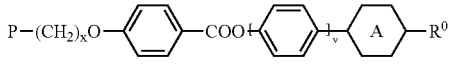

(Ve)

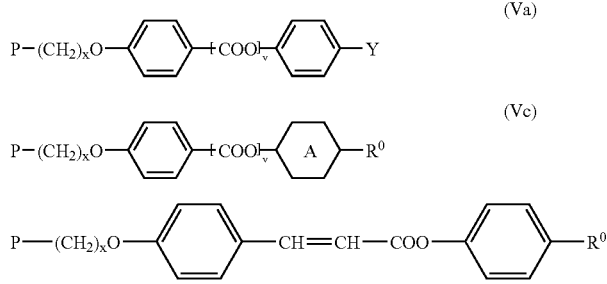

-continued
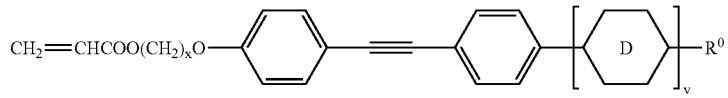 (Vf)
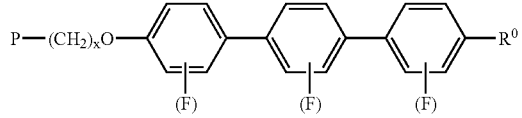 (Vg)
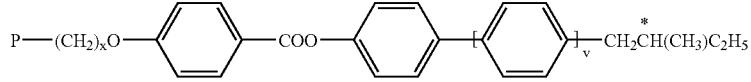 (Vh)
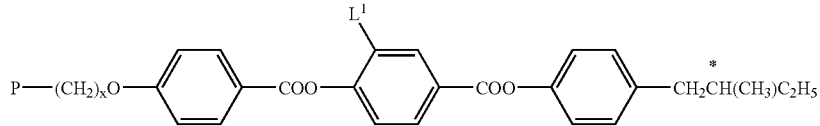 (Vi)
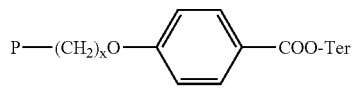 (Vk)
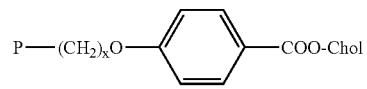 (Vm)
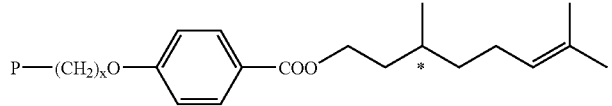 (Vn)
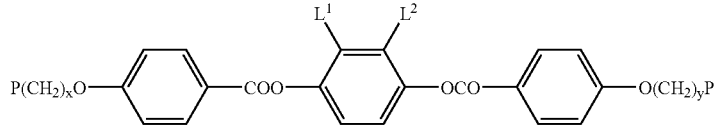 (VIa)
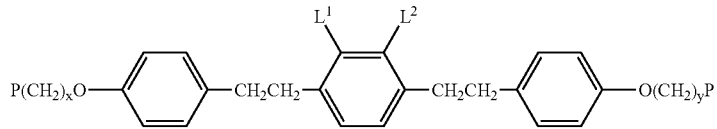 (VIb)
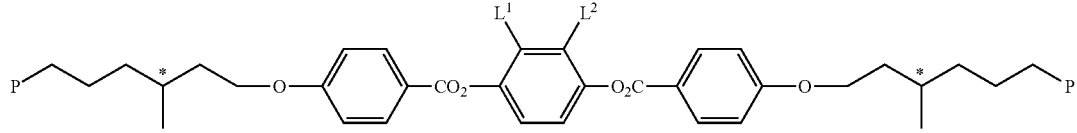 (VIc)
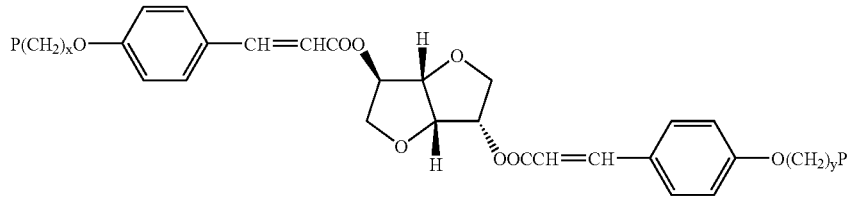 (VId)

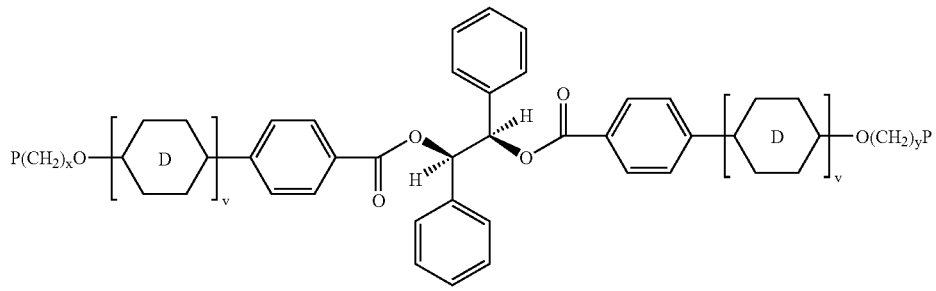

(VIe)

wherein P has one of the meanings of formula I and its preferred meanings as mentioned above, x and y are identical or different integers from 1 to 12, A and D are 1,4-phenylene or 1,4-cyclohexylene, v is 0 or 1, Y is a polar group, $R^0$ is a non-polar alkyl or alkoxy group, Ter is a terpenoid radical like e.g. menthyl, Chol is a cholesteryl group, and $L^1$ and $L^2$ are each independently H, F, Cl, OH, CN, $NO_2$ or optionally alkyl, alkoxy, alkylcarbonyl or alkoxycarbonyl with 1 to 7 C atoms.

The term 'polar group' in this connection means a group selected from F, Cl, CN, $NO_2$, OH, $OCH_3$, OCN, SCN, an optionally fluorinated carbonyl or carboxyl group with up to 4 C atoms or a mono-oligo- or polyfluorinated alkyl or alkoxy group with 1 to 4 C atoms. The term 'non-polar group' means an alkyl group with 1 or more, preferably 1 to 12 C atoms or an alkoxy group with 2 or more, preferably 2 to 12 C atoms.

The polymerisable liquid crystal mixture may also comprise one or more non-reactive chiral dopants in addition or alternatively to chiral polymerisable mesogenic compounds. Typically used chiral dopants are e.g. the commercially available R or S 811, R or S 1011, R or S 2011 or CB 15 (from Merck KGaA, Darmstadt, Germany).

Very preferred are chiral dopants with a high helical twisting power (HTP), in particular dopants comprising a sorbitol group as described in WO 98/00428, dopants comprising a hydrobenzoin group as described in GB 2,328,207, chiral binaphthyl derivatives as described in EP 01111954.2, chiral binaphthol acetal derivatives as decribed in EP 01104842.8, chiral TADDOL derivatives as described in WO 02/06265, and chiral dopants with at least one fluorinated linkage group and a terminal or central chiral group as described in WO 02/06196 and WO 02/06195.

To prepare anisotropic polymer films, the polymerisable liquid crystal is preferably coated onto a substrate, aligned and polymerised in situ, for example by exposure to heat or actinic radiation, to fix the orientation of the liquid crystal molecules. Alignment and curing are carried out in the liquid crystalline phase of the mixture.

The substrate is for example a glass or quartz sheet or a plastic film or sheet, and can be removed after polymerisation or not. Suitable plastic substrates are for example polyethyleneterephthalate (PET) or polyethylenenaphthalate (PEN), of polyvinylalcohol (PVA), polycarbonate (PC) or triacetylcellulose (TAC). The polymerisable chiral LC material may also be dissolved or dispersed in an organic solvent that is evaporated before or during polymerisation.

Alignment of the liquid crystal material can be achieved for example by treatment of the substrate onto which the material is coated, by shearing the material during or after coating, by application of a magnetic or electric field to the coated material, or by the addition of surface-active compounds to the liquid crystal material. Reviews of alignment techniques are given for example by I. Sage in "Thermotropic Liquid Crystals", edited by G. W. Gray, John Wiley & Sons, 1987, pages 75-77, and by T. Uchida and H. Seki in "Liquid Crystals— Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

Polymerisation can be achievded by exposure to heat or actinic radiation. Actinic radiation means irradiation with light, like UV light, IR light or visible light, irradiation with X-rays or gamma rays or irradiation with high energy particles, such as ions or electrons.

Preferably polymerisation is carried out by UV irradiation at a non-absorbing wavelength. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

Polymerisation is carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable mesogens with acrylate or methacrylate groups, preferably a radical photoinitiator is used, when curing polymerisable mesogens vinyl and epoxide groups, preferably a cationic photoinitiator is used. It is also possible to use a polymerisation initiator that decomposes when heated to produce free radicals or ions that start the polymerisation. As a photoinitiator for radical polymerisation for example the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used.

The polymerisable material can additionally comprise one or more other suitable components such as, for example, catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

Compounds of formula I comprising a chiral group are suitable as chiral dopants.

Furthermore, the compounds of formula I are suitable as comonomers for liquid crystal materials with semiconductor or charge carrier properties, which can be used in electronic devices like for example field effect transistors (FET) as components of integrated circuitry, as thin film transistors in flat panel display applications or for Radio Frequency Identification (RFID) tags, or semiconducting components for organic light emitting diode (OLED) applications such as electroluminescent displays or backlights of e.g. liquid crystal displays, photovoltaic or sensor devices, photoconductors, or electrophotographic applications like electrophotographic recording devices.

For example, semiconductors comprising polymerisable liquid crystal compounds are disclosed in WO 00/79617, JP-A-2000-347432, JP-A-11-209761, Sirringhaus et al., Appl. Phys. Lett., 77(3) (2000) 406-408, and Grell et al., J. Korean Phys. Soc. 2000, 36(6), 331. Electroluminescent devices using liquid crystal materials are described for example in WO 95/17018 and WO 95/04306. Organic photoconductors with liquid crystal properties are described for example in EP 0 563 768 and EP 0 527 376.

Without further elaboration, it is believed that one skilled in the art can, using the preceding description, utilize the present invention to its fullest extent. The following examples are, therefore, to be construed as merely illustrative and not limitative of the remainder of the disclosure in any way whatsoever.

In the foregoing and in the following examples, unless otherwise indicated, all temperatures are set forth uncorrected in degrees Celsius and all parts and percentages are by weight.

The following abbreviations are used to illustrate the liquid crystalline phase behaviour of the compounds: K=crystalline; N=nematic; S=smectic; Ch=cholesteric; I=isotropic. The numbers between the symbols indicate the phase transition temperatures in ° C. Furthermore, clp. is the clearing point in ° C., Δn is the optical anisotropy measured at 20° C. and 589 nm, Δε is the dielectric anisotropy at 20° C. and 1 kHz. DCM is dichloromethane. DCCI is dicyclohexylcarbodiimide. DMAP is 4-dimethylamino pyridine.

"Conventional workup" means: water is added if necessary, the mixture is extracted with dichloromethane, diethyl ether or toluene, the phases are separated, the organic phase is dried and concentrated by evaporation, and the product is purified by crystallization and/or chromatography.

EXAMPLE 1

Compound (1) is prepared acording to reaction scheme 1.

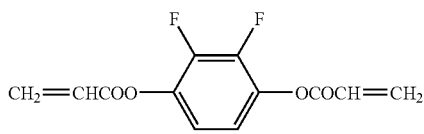
(1)

Preparation of 2,3-difluorohydroquinone 132 ml (0.21 mol) BuLi (15% in n-hexane) are added dropwise to a solution of 31.6 g (0.2 mol) 1-ethoxy-2,3-difluorobenzene in 500 ml THF at −70° C. After stirring for 1 hour 21.8 g (0.21 mol) triethylborate are added. At −15° C. a mixture of 25 ml glacial acetic acid and 35 ml water is added. The mixture is heated to 30° C. and 68 g (0.6 mol) hydrogen peroxide (30%) are added. After conventional workup the crude product is dissolved in 160 ml glacial acetic acid, 160 ml conc. hydrobromic acid are added, and the mixture is heated at reflux overnight.

Preparation of (1)

116.5 ml (0.84 mol) triethylamine are added dropwise to a mixture of 24.5 g (0.168 mol) 2,3-difluoro-hydroquinone, 34 ml (0.353 mol) 3-chloropropionic acid chloride and 250 ml DCM dichloromethane under cooling, and the mixture is stirred overnight. After conventional workup (1) is obtained as crude product with a yield of 42 g (98.4%). Further purification by chromatography in n-hexane/ethyl acetate 3:1 and recrystallization from n-hexane yielded white crystals.

Compound (1) has a melting point of 58° C.

Comparison: The corresponding unfluorinated compound hydroquinone bisacrylate known from prior art has a melting point of 87° C. which is significantly larger.

EXAMPLE 2

Compound (2) is prepared as described below.

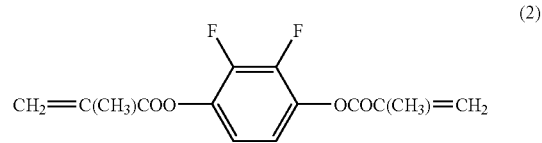
(2)

A solution of 53.6 g (0.26 mol) DCCI in 250 ml THF is added to a solution of 14.6 (0.1 mol) 2,3-difluoro-hydroquinone, 21.5 g (0.25 mol) methacrylic acid and 1 g DMAP in 500 ml toluene at 10° C. and stirred overnight. After addition of 1.5 g oxalic acid and conventional workup (2) is obtained as colourless crystals.

Compound (2) has a melting point of 59° C.

Comparison: The corresponding unfluorinated compound hydroquinone dimethacrylate known from prior art has a melting point of 90° C. which is significantly larger.

The invention claimed is:

1. A polymerizable compound of formula I

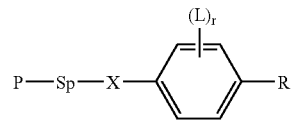
I wherein
P is a polymerizable group CH$_2$=CW$^1$—COO—,

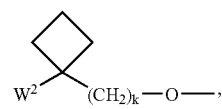

CH$_2$=CW$^2$—O—, CH$_3$—CH=CH—O—, or CH$_2$=CW$^1$—CO—NH—, with W$^1$ being H, Cl, CN, phenyl or alkyl with 1 to 5 C-atoms, W$^2$ being H or alkyl with 1 to 5 C-atoms, and k is 0 or 1, Sp is a spacer group or a single bond,
X is —O—, —S—, —OCH$_2$—, —CH$_2$O—, —CO—, —COO—, —OCO—, —OCO—O—, —CO—NR$^0$—, —NR$^0$—CO—, —OCH$_2$—, —CH$_2$O—, —SCH$_2$—, —CH$_2$S—, —CH=CH—COO—, —OOC—CH=CH— or a single bond,
R is P-Sp-X, $R^0$ is H or alkyl with 1 to 4 C atoms, L is F, $CF_3$, $OCF_3$, $OCHF_2$, or alkoxy with 2 to 7 C atoms, or alkylcarbonyl, alkoxycarbonyl or alkylcarbonyloxy with 2 to 7 C atoms, wherein one or more H atoms are optionally substituted by F, and r is 1, 2 or 3.

2. A polymerizable compound according to claim 1, wherein L is F, $OC_2H_5$, $COCH_3$, $COC_2H_5$, $COOCH_3$, $COOC_2H_5$, $CF_3$, $OCF_3$, $OCHF_2$ or $OC_2F_5$.

3. A polymerizable compound according to claim 1, wherein P is an acrylate, methacrylate, vinyloxy, or propenyl ether.

4. A polymerizable compound according to claim 1, wherein Sp and X are each a single bond.

5. A polymerizable compound of formula I

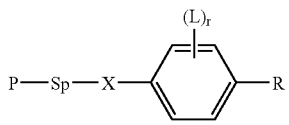

wherein

P is a polymerizable group $CH_2=CW^1-COO-$,

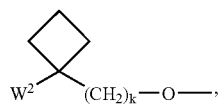

$CH_2=CW^2-O-$, $CH_3-CH=CH-O-$, or $CH_2=CW^1-CO-NH-$, with $W^1$ being H, Cl, CN, phenyl or alkyl with 1 to 5 C-atoms, $W^2$ being H or alkyl with 1 to 5 C-atoms, and k is 0 or 1, Sp is alkylene with 1 to 12 C atoms that is optionally mono- or polysubstituted by F and wherein one or more non-adjacent $CH_2$ groups are replaced, in each case independently from one another, by $-O-$, $-CH=CH-$ or $-C\equiv C-$, and X is $-O-$, $-COO-$, $-OCO-$, $-OCOO-$ or a single bond, X is $-O-$, $-S-$, $-OCH_2-$, $-CH_2O-$, $-CO-$, $-COO-$, $-OCO-$, $-OCO-O-$, $-CO-NR^0-$, $-NR^0-CO-$, $-OCH_2-$, $-CH_2O-$, $-SCH_2-$, $-CH_2S-$, $-CH=CH-COO-$, $-OOC-CH=CH-$ or a single bond, R is P-Sp-X, $R^0$ is H or alkyl with 1 to 4 C atoms, L is F, or alkyl or alkoxy with 1 to 7 C atoms, or alkylcarbonyl, alkoxycarbonyl or alkylcarbonyloxy with 2 to 7 C atoms, wherein one or more H atoms are substituted by F, and r is 1, 2 or 3.

6. A polymerizable compound of formula I1a, I1b, or I1c,

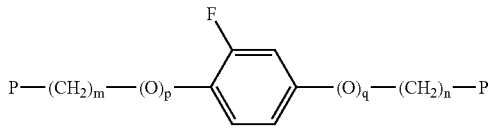

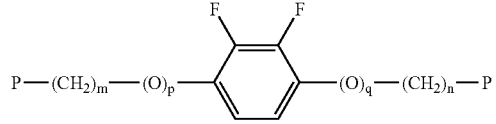

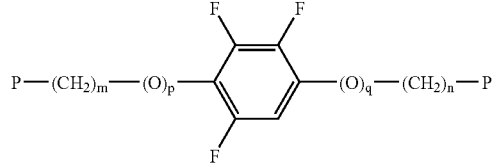

wherein

P is a polymerizable group selected from $CH_2=CW^1-COO-$,

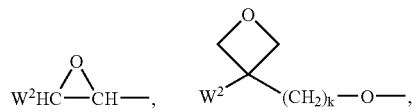

$CH_2=CW^2-O-$, $CH_3-CH=CH-O-$, $HS-CW^2W^3-$, $HW^2N-$, $HO-CW^2W^3-NH-$, $CH_2=CW^1-CO-NH-$, $OCN-$ and $W^4W^5W^6Si-$, with $W^1$ being H, Cl, CN, phenyl or alkyl with 1 to 5 C-atoms, $W^2$ and $W^3$ being independently of each other H or alkyl with 1 to 5 C-atoms, $W^4$, $W^5$ and $W^6$ being independently of each other Cl, oxaalkyl or oxacarbonylalkyl with 1 to 5 C-atoms, and k is 0 or 1, m and n are identical or different integers from 0 to 12, and p and q are independently of each other 0 or 1, with the proviso that p is 0 when m is 0 and q is 0 when n is 0.

7. A polymerizable compound according to claim 6, wherein m, n, p and q are 0.

8. A liquid crystal mixture comprising at least one polymerizable compound of formula I

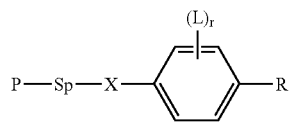

wherein

P is a polymerizable group selected from $CH_2=CW^1-COO-$,

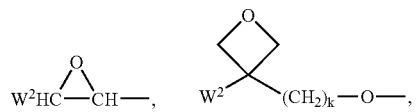

$CH_2=CW^2-(O)_{k1}-$, $CH_3-CH=CH-O-$, $HO-CW^2W^3-$, $HS-CW^2W^3-$, $HW^2N-$, $HO-CW^2W^3-NH-$, $CH_2=CW^1-CO-NH-$, $OCN-$ and $W^4W^5W^6Si-$, with $W^1$ being H, Cl, CN, phenyl or alkyl with 1 to 5 C-atoms, $W^2$ and $W^3$ being independently of each other H or alkyl with 1 to 5 C-atoms, $W^4$, $W^5$ and $W^6$ being independently of each other Cl, oxaalkyl or oxacarbonylalkyl with 1 to 5 C-atoms, and $k_1$ and k being independently of each other 0 or 1, Sp is a spacer group or a single bond, X is —O—, —S—, —OCH$_2$—, —CH$_2$O—, —CO—, —COO—, —OCO—, —OCO—O—, —CO—NR$^0$—, —NR$^0$—CO—, —OCH$_2$—, —CH$_2$O—, —SCH$_2$—, —CH$_2$S—, —CH=CH—COO—, —OOC—CH=CH— or a single bond, R is P-Sp-X, $R^0$ is H or alkyl with 1 to 4 C atoms, L is F, Cl, Br, I, CN, $NO_2$, or alkyl, or alkoxy with 1 to 7 C atoms, alkylcarbonyl, alkoxycarbonyl or alkylcarbonyloxy with 2 to 7 C atoms, wherein one or more H atoms are optionally substituted by F or Cl, and r is 1, 2 or 3.

9. A liquid crystal mixture according to claim 8, further comprising at least one polymerizable mesogenic or non-mesogenic compound having at least one polymerizable group.

10. An anisotropic polymer or polymer film obtained from a liquid crystal mixture according to claim 8.

11. A liquid crystal display, an optical film, a polariser, a compensator, a beam splitter, a reflective film, an alignment layer, a color filter, a holographic element, a hot stamping foil, a colored image, a decorative or security marking, a liquid crystal pigment, an adhesive, a synthetic resin with anisotropic mechanical properties, a cosmetic composition, a diagnostics agent, a nonlinear optics element, an optical information storage element, a chiral dopant, an electronic device, a field effect transistor, an integrated circuitry element, a thin film transistor, a radio frequency identification tag, a semiconducting component, an organic light emitting diode, an electroluminescent display, a backlight for a liquid crystal display, a photovoltaic device, a sensor device, an electrode material, a battery, a photoconductor, or an electrophotographic recording comprising a compound of claim 1, or a mixture, polymer, or polymer film comprising a compound of claim 1.

12. A liquid crystal display comprising in its active layer a polymerizable compound of formula I

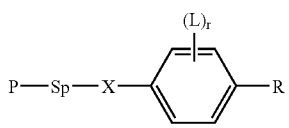

wherein

P is a polymerizable group selected from CH$_2$=CW$^1$—COO—,

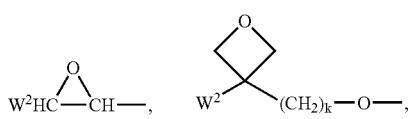

CH$_2$=CW$^2$—(O)$_{k1}$—, CH$_3$—CH=CH—O—, HO—CW$^2$W$^3$—, HS—CW$^2$W$^3$—, HW$^2$N—, HO—CW$^2$W$^3$—NH—, CH$_2$=CW$^1$—CO—NH—, OCN— and W$^4$W$^5$W$^6$Si—, with W$^1$ being H, Cl, CN, phenyl or alkyl with 1 to 5 C-atoms, W$^2$ and W$^3$ being independently of each other H or alkyl with 1 to 5 C-atoms, W$^4$, W$^5$ and W$^6$ being independently of each other Cl, oxaalkyl or oxacarbonylalkyl with 1 to 5 C-atoms, and $k_1$ and k being independently of each other 0 or 1, Sp is a spacer group or a single bond, X is —O—, —S—, —OCH$_2$—, —CH$_2$O—, —CO—, —COO—, —OCO—, —OCO—O—, —CO—NR$^0$—, —NR$^0$—CO—, —OCH$_2$—, —CH$_2$O—, —SCH$_2$—, —CH$_2$S—, —CH=CH—COO—, —OOC—CH=CH— or a single bond, R is P-Sp-X, $R^0$ is H or alkyl with 1 to 4 C atoms, L is F, Cl, Br, I, CN, $NO_2$, or alkyl, or alkoxy with 1 to 7 C atoms, alkylcarbonyl, alkoxycarbonyl or alkylcarbonyloxy with 2 to 7 C atoms, wherein one or more H atoms are optionally substituted by F or Cl, and r is 1, 2 or 3, or a mixture, polymer, or polymer film, comprising the polymerizable compound of formula I.

13. A liquid crystal display according to claim 12, wherein the display is a TN, STN, AMD-TN, ECB, VA, PS, PSCT or PDLC display.

14. A polymerizable compound of formula I

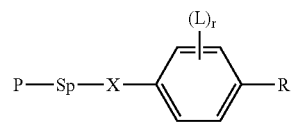

wherein

P is a polymerizable group CH$_2$=CW$^1$—COO—,

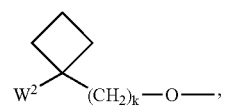

CH$_2$=CW$^2$—O—, CH$_3$—CH=CH—O—, HS—CW$^2$W$^3$—, HW$^2$N—, HO—CW$^2$W$^3$—NH—, CH$_2$=CW$^1$—CO—NH—, or OCN—, with W$^1$ being H, Cl, CN, phenyl or alkyl with 1 to 5 C-atoms, W$^2$ and W$^3$ being independently of each other H or alkyl with 1 to 5 C-atoms, and k is 0 or 1, Sp is a spacer group or a single bond, X is —O—, —S—, —OCH$_2$—, —CH$_2$O—, —CO—, —COO—, —OCO—, —OCO—O—, —CO—NR$^0$—, —NR$^0$—CO—, —OCH$_2$—, —CH$_2$O—, —SCH$_2$—, —CH$_2$S—, —CH=CH—COO—, —OOC—CH=CH— or a single bond, R is P-Sp-X, $R^0$ is H or alkyl with 1 to 4 C atoms, L is F, or alkyl or alkoxy with 1 to 7 C atoms, or alkylcarbonyl, alkoxycarbonyl or alkylcarbonyloxy with 2 to 7 C atoms, wherein one or more H atoms are substituted by F, and r is 2 or 3.

15. A polymerizable compound according to claim 1, wherein L is F, $CF_3$, $OCF_3$, $OCHF_2$ or alkoxy with 2 to 7 C atoms, or alkylcarbonyl, alkoxycarbonyl or alkylcarbonyloxy with 2 to 7 C atoms, wherein one or more H atoms are substituted by F.

16. A polymerizable compound according to claim 1, wherein $W^1$ is H, Cl or $CH_3$, and/or $W^2$ is H or methyl, ethyl or n-propyl.

17. A polymerizable compound according to claim 5, wherein P is an acrylate, methacrylate, vinyloxy, or propenyl ether group.

18. A polymerizable compound according to claim 15, wherein P is an acrylate, methacrylate, vinyloxy, or propenyl ether group.

19. A liquid crystal mixture according to claim 8, wherein in the polymerizable compound of formula I, P is an acrylate, methacrylate, vinyloxy, or propenyl ether group.

20. A polymerizable compound according to claim 1, wherein L is F, $CF_3$, $OCF_3$, $OCHF_2$, or alkoxy with 3 to 7 C atoms, or alkylcarbonyl, alkoxycarbonyl or alkylcarbonyloxy with 2 to 7 C atoms, wherein one or more H atoms are optionally substituted by F.

21. A polymerizable compound according to claim 1, wherein L is F, or alkylcarbonyl, alkoxycarbonyl or alkylcarbonyloxy with 2 to 7 C atoms, wherein one or more H atoms are optionally substituted by F.

22. A polymerizable compound according to claim 1, wherein of formula I

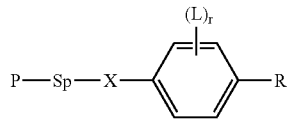

I wherein

P is a polymerizable group $CH_2=CW^1-COO-$,

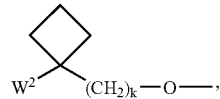

$CH_2=CW^2-O-$, $CH_3-CH=CH-O-$, or $CH_2=CW^1-CO-NH-$, with $W^1$ being H, Cl, CN, phenyl or alkyl with 1 to 5 C-atoms, $W^2$ being H or alkyl with 1 to 5 C-atoms, and k is 0 or 1, Sp is a spacer group or a single bond, X is $-O-$, $-S-$, $-OCH_2-$, $-CH_2O-$, $-CO-$, $-COO-$, $-OCO-$, $-OCO-O-$, $-CO-NR^0-$, $-NR^0-CO-$, $-OCH_2-$, $-CH_2O-$, $-SCH_2-$, $-CH_2S-$, $-CH=CH-COO-$, $-OOC-CH=CH-$ or a single bond, R is P-Sp-X, $R^0$ is H or alkyl with 1 to 4 C atoms, L is F, or alkyl, or alkoxy with 2 to 7 C atoms, or alkylcarbonyl, alkoxycarbonyl or alkylcarbonyloxy with 2 to 7 C atoms, wherein one or more H atoms are substituted by F, and r is 1, 2 or 3.

23. A liquid crystal display according to claim 12, wherein P is a polymerizable group $CH_2=CW^1-COO-$,

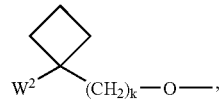

$CH_2=CW^2-O-$, $CH_3-CH=CH-O-$, or $CH_2=CW^1-CO-NH-$, with $W^1$ being H, Cl, CN, phenyl or alkyl with 1 to 5 C-atoms, $W^2$ being H or alkyl with 1 to 5 C-atoms, and k is 0 or 1.

* * * * *

UNITED STATES PATENT AND TRADEMARK OFFICE
CERTIFICATE OF CORRECTION

PATENT NO. : 7,465,479 B2  Page 1 of 1
APPLICATION NO. : 10/326150
DATED : December 16, 2008
INVENTOR(S) : Matthias Bremer It is certified that error appears in the above-identified patent and that said Letters Patent is hereby corrected as shown below:

Column 17, line 43, reads "—C=C—" should read-- —C≡C— --

Column 20, line 23, reads "PS," should read -- IPS, --

Column 21, line 15, reads "according to claim 15," should read -- according to claim 6, --

Signed and Sealed this

First Day of September, 2009

David J. Kappos
*Director of the United States Patent and Trademark Office*